United States Patent [19]

Beach et al.

[11] Patent Number: 5,388,268

[45] Date of Patent: Feb. 7, 1995

[54] METHODS OF INDICATING STATES OF SOFTWARE PROCESSES COOPERATING ON A SINGLE TASK

[75] Inventors: Brian W. Beach, Santa Cruz, Calif.; Anand Deshpande, Pune, India; Wendy L. Fong; Pankaj K. Garg, both of Sunnyvale, Calif.; Audrey K. Ishizaki, Los Altos, Calif.; Thuan Q. Pham, San Jose, Calif.

[73] Assignee: Hewlett-Packard Company, Palo Alto, Calif.

[21] Appl. No.: 234,496

[22] Filed: Apr. 28, 1994

Related U.S. Application Data

[63] Continuation of Ser. No. 947,233, Sep. 18, 1992, abandoned.

[51] Int. Cl.6 .............................................. G06F 11/00
[52] U.S. Cl. ..................... 395/700; 395/650; 364/DIG. 1; 364/264; 364/264.1; 364/264.6; 364/284; 364/284.3
[58] Field of Search .............. 395/650, 700; 364/264, 364/264.6, 284, 284.3, 264.1, 920.4

[56] References Cited

U.S. PATENT DOCUMENTS

| | | | |
|---|---|---|---|
| 3,559,188 | 1/1971 | Proctor | 364/200 |
| 3,644,936 | 2/1972 | Holtwick et al. | 444/1 |
| 3,668,653 | 6/1972 | Fair et al. | 364/474.11 |
| 3,720,814 | 3/1973 | Klein | 364/474.11 |
| 3,906,454 | 9/1975 | Martin | 340/172.5 |
| 4,109,309 | 8/1978 | Johnstone et al. | 364/120 |
| 4,251,858 | 2/1981 | Cambique et al. | 364/102 |
| 4,369,494 | 1/1983 | Bienvenu et al. | 364/200 |
| 4,521,014 | 6/1985 | Sitrick | 273/1 GC |
| 4,590,550 | 5/1986 | Eilert et al. | 364/200 |
| 4,860,200 | 8/1989 | Holombo | 364/200 |
| 4,949,248 | 8/1990 | Caro | 364/200 |
| 5,103,394 | 4/1992 | Blasciak | 395/575 |
| 5,151,978 | 9/1992 | Bronikowski et al. | 395/200 |
| 5,159,673 | 10/1992 | Sackman et al. | 395/325 |
| 5,163,151 | 11/1992 | Bronikowski et al. | 395/725 |
| 5,165,014 | 11/1992 | Vassar | 395/112 |
| 5,237,684 | 8/1993 | Record et al. | 395/650 |
| 5,245,704 | 9/1993 | Weber et al. | 395/200 |

OTHER PUBLICATIONS

Helfer; "Structure of Performance Monitor for Distributed Computer Systems"; *IBM Technical Disc. Bull.;* v 20, No. 11B; 1978.

Helfer; "Performance Monitor of Small Remote Computer Systems"; *IBM Tech. Dis. Bull;* v 19, No. 6, 1976 Nov.

Reddy; "Traffic Control: Network Monitors Keep Your LAN From Going South"; LAN magazine; 1990 May; p. 76.

*Primary Examiner*—Thomas M. Heckler
*Assistant Examiner*—J. Hall Backenstose
*Attorney, Agent, or Firm*—Peter P. Tong

[57] ABSTRACT

A visual display system providing an operator simultaneous descriptions of the states of many cooperating sub-processes working on a task and residing in various instruments in a distributed system. A server process is connected to receive and translate status signals from the sub-processes into a standardized language. The translated signals are interpreted by a screen manipulation program. A monitor, connected to the server process, displays the interpreted signals to show the states of the sub-processes. The visual indication on the monitor includes a plurality of representations of indicator lights. Each indicator light indicates the state of one of the sub-processes. Next to each indicator light is an identifier which identifies the sub-process represented by the indicator light. The visual indication also includes two types of meters. One type of meter indicates the speed of one of the sub-processes and the other indicates the amount of data used at any given time by one of the sub-processes. Finally, a picture of each of the operators using the system is also included in the indication. In one embodiment, the present invention is implemented to monitor a rule-based programming environment using the X Window System.

9 Claims, 5 Drawing Sheets

METHODS OF INDICATING STATES OF SOFTWARE PROCESSES COOPERATING ON A SINGLE TASK

CROSS REFERENCE TO RELATED APPLICATION

This is a continuation of copending application Ser. No. 07/947,233 filed on Sep. 18, 1992, now abandoned.

BACKGROUND OF THE INVENTION

The present invention relates generally to electronic computer systems and more particularly to a method and apparatus for providing visual indications of the states of a plurality of software processes located in various instruments of a distributed computer system.

A software process is a software program in execution. Software processes can be idle or running and can be located in many different instruments or workstations of a distributed system. An operator can assign many software processes in a distributed system to work together to perform a task. The task can often be divided into many sub-tasks performed by various ones of the software processes. Due to the complexities of the sub-tasks or insufficient speed of the instruments or conflicting demands from other operators on the instruments, some sub-tasks might take a long time to finish. If the states of the software processes are known, then the operator can determine the conditions of the sub-tasks, find out where any bottleneck is and take appropriate action for the system to perform the task more efficiently.

To determine the state of a software process, the operator typically has to log onto the instrument hosting the software process and execute various commands. If the operator needs to find out the states of many software processes located in different instruments, the operator has to log onto and execute commands in each of the many instruments hosting the software processes. After the operator has determined the state of one software process, that state may change while the operator is busy finding the state of another software process. This may give a wrong picture of the states of the various software processes.

In monitoring the states of some of the software processes, sometimes the operator needs to know more than just whether the software processes are busy or idle; in certain cases, the operator also needs to find out the speed and the efficiency of the software processes.

It is apparent from the foregoing that there is a need for a way to monitor the states of many software processes residing in various instruments. It would be beneficial if the states could be visually displayed in real time. Furthermore, it would be desirable that some software processes could be monitored in more detail than just whether the software processes are busy or idle.

SUMMARY OF THE INVENTION

A visual display system according to the invention provides an operator simultaneous descriptions of the states of many cooperating sub-processes residing in various instruments in a distributed computer system. With this invention, after an operator has initiated a task to be performed by the cooperating sub-processes, the operator can easily identify any bottlenecks in the task. The operator can tell not only the fact that a sub-process is busy or idle but also the speed and the efficiency of the sub-process; further, the operator can tell if there are any competing demands on the instrument running the sub-process. This information enables the operator to take appropriate steps to increase the efficiency of the sub-processes in performing the task.

In a preferred embodiment, a distributed system has a monitor and a plurality of sub-processes. The sub-processes reside in various ones of a plurality of instruments. Each sub-process is programmed to transmit a signal to a server process when the state of the sub-process changes. In describing its state, each sub-process uses its own language. The server process, which is also a software process, receives the signal from each of the sub-processes. Then the server process determines the states of the sub-processes. Any of the received signals that are not expressed in a standardized language are translated into that standardized language. After the translation, the server process uses a screen manipulation program to interpret each of the translated signals to form a visual indication of the states of the sub-processes. The visual indications are then transmitted by the server process to the monitor to display information about the states of the sub-processes.

The visual indication preferably includes a plurality of representations of indicator lights. Each indicator light has more than one state. Each light by its state indicates the state of one of the sub-processes; one state of the light, such as a blinking light, indicates that the sub-process is running; another state, such as a light having constant intensity, indicates that the sub-process is idle. Next to each indicator light is an identifier which identifies the sub-process represented by that indicator light.

The indication also preferably includes pictures of operators and two types of meters. As one of the sub-processes is performing a task, one type of meter depicts the speed of the sub-process and the other type of meter depicts the amount of data being used by the sub-process at any given time. Finally, a picture of each operator using the distributed system is also shown on the monitor.

In one embodiment, the present invention is implemented to monitor a rule-based programming environment using a screen manipulation program known as the X Window System.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

The present invention provides a visual indication of the states of many software sub-processes that are working together to perform a task even though they reside in various host instruments in a distributed system. To obtain such an indication, it has been necessary for an operator to log onto each host in turn to find out the states of the sub-processes running on that host, a procedure which is time consuming, inefficient, and might even give incorrect conclusions.

By means of the present invention, the operator is provided with a visual indication of the states of the sub-processes.

Any bottlenecks can be identified and appropriate corrective action can be taken. The efficiencies and speeds of the sub-processes are also displayed, thereby indicating to the operator whether any conflicting demands are being made on any of the host instruments. The operator is also provided with pictures of operators using the system.

Figure 1:
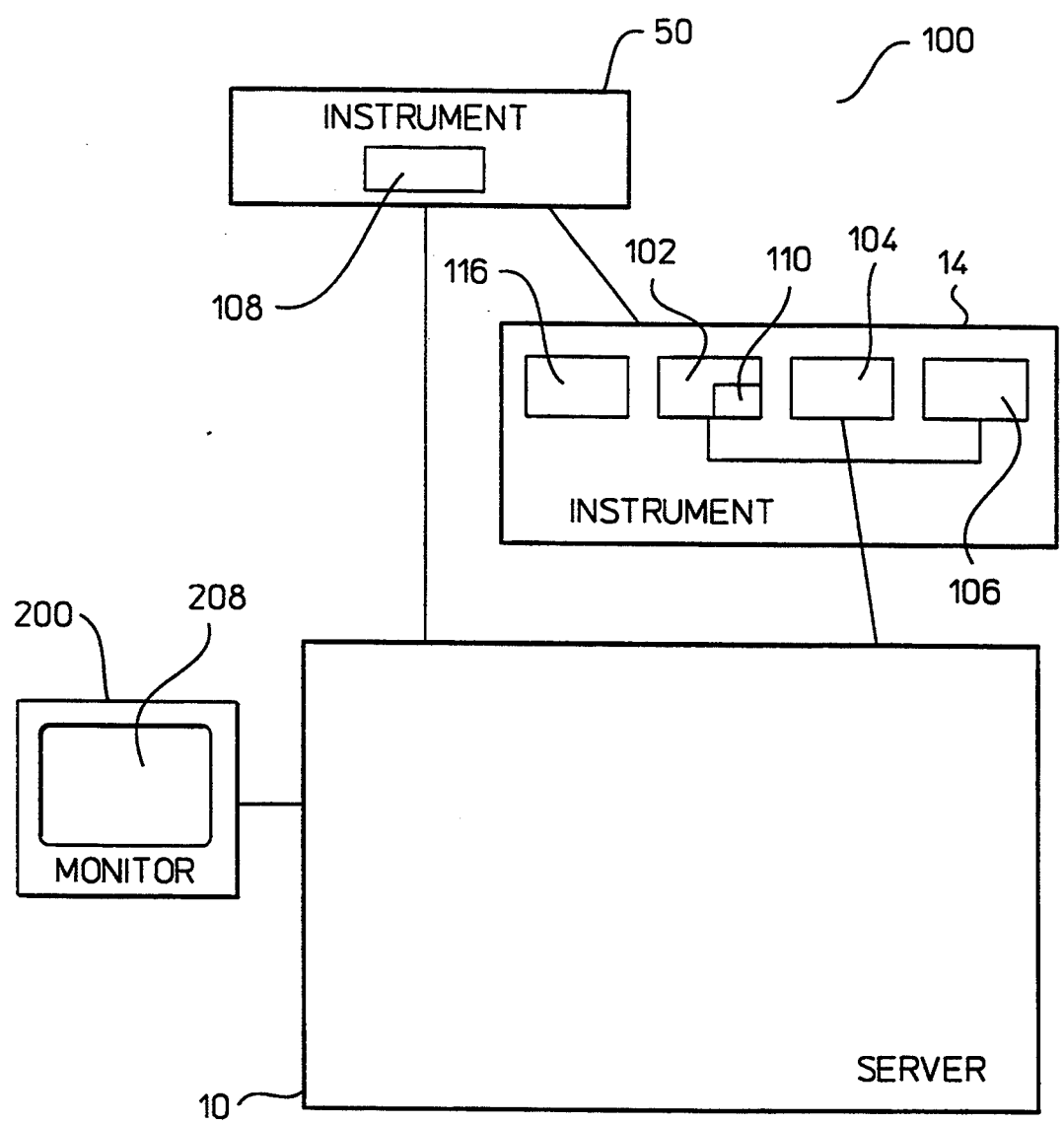
FIG. 1 shows an existing distributed system of the kind in which the invention may be implemented.

As shown in the exemplary drawings for purposes of illustration, the invention is implemented in a distributed system. FIG. 1 depicts a distributed system 100 of the kind in which the invention may be implemented. The system 100 has a plurality of sub-processes 102, 104, 106, and 108. Each sub-process resides in one of the instruments in the distributed system, such as sub-process 102 residing in instrument 14.

An operator activates the system and inputs his or her identity to the system. Then the operator selects or creates a plurality of sub-processes to perform a task. The sub-processes are written so that they generate signals describing their states, and when their states change, they will send signals to a server process 10. For example, when a sub-process 102 is selected, it generates and asynchronously transmits a connection request signal, through its symbolically represented element 110, to the server process 10; if the sub-process 102 becomes busy, the sub-process transmits a busy signal to the server process, because its state changes from the state of being idle to the state of busy.

Once the server process 10 receives a connection request signal, the server process connects to receive the signal from that requesting sub-process. If the sub-process 102 is down, it cannot send a connection request to the server process 10 and the sub-process will not be connected to the server process 10. The server process 10 serves as the center for receiving the status information from each of the sub-processes.

Each sub-process communicates its state to the server process in its own language. The server process translates the signals received from each of the sub-processes that are not expressed in a standardized language into the standardized language. The server process then uses a screen manipulation program to interpret the translated signals. The type of standardized language depends on the type of screen manipulation program used by the server. One type of screen manipulation program is the X Window System. The server asynchronously transmits the interpreted signal to a monitor 200 which then visually displays the states of the sub-processes in a visual indication 208.

Figure 2:
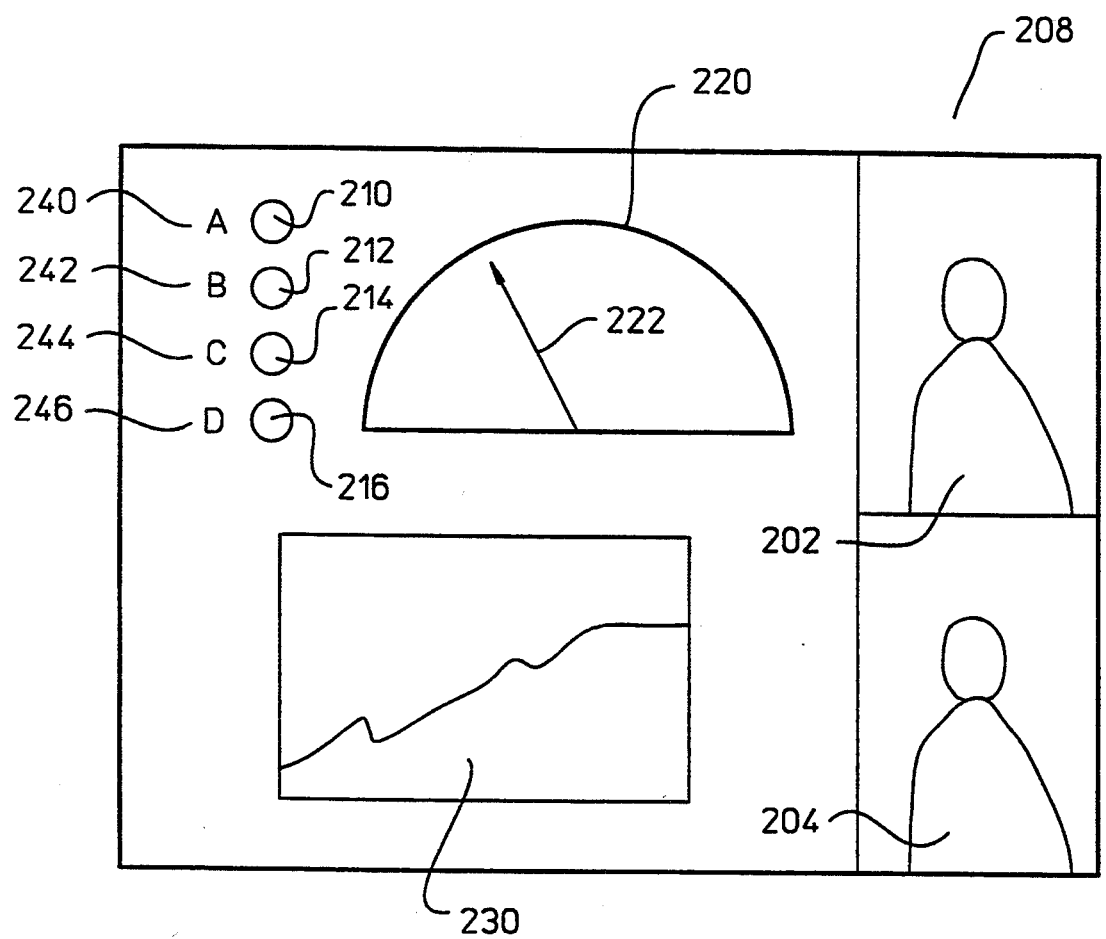
FIG. 2 shows a preferred embodiment of the visual indication shown on a monitor.

FIG. 2 shows one preferred embodiment of the visual indication 208 shown on the monitor 200. The visual indication 208 includes a plurality of representations of indicator lights 210, 212, 214, and 216. Each indicator light has more than one state such that each light by its state indicates the state of one of the sub-processes. One state of the light, such as a light with constant intensity, indicates that the sub-process is idle. Another state, such as a blinking light, indicates that the sub-process is running. For example, if the sub-process 102 is becoming busy, its state changes; so the sub-process sends a signal to the server process, which in turn sends a signal to the monitor. The indicator light 210, after receiving the signal from the server process, blinks to indicate that the sub-process 102 is busy. The constant intensity preferably is a green light while the blinking preferably is continually alternating the color of the light between green and red, giving the indicator light the look and feel of a blinking LED.

Next to each indicator light is an identifier that identifies the sub-process represented by that indicator light. In one embodiment, there are four identifiers "A", "B", "C", and , "D"; the distribution system predetermines what they are. For example, next to indicator light 210 is the identifier "A", 240 that identifies the sub-process 102. An operator can reprogram the system to show a different number of identifiers or a different identifier.

A sub-process can be busy or idle. Constantly monitoring the state of each sub-process to see if the sub-process has changed, would require a significant overhead on the server process. To avoid that, the sub-process takes the initiative to send a signal to the server process when the state of that sub-process changes.

The visual indication also preferably includes two types of meters. One type of meter 220 depicts the speed of a sub-process performing a task as the sub-process is running. When the sub-process changes speed, it transmits a signal to the server process. The server process translates the signal into a standardized language and uses a screen manipulation program to interpret the translated signal. The interpreted signals are transmitted to the monitor to indicate the change in speed. The type of standardized language again depends on the screen manipulation program used by the server. One type of such program is the X Window System. When the sub-process is running faster, the needle 222 on the meter moves to a higher reading. The operator can compare the speed of two instruments by having each of them run the same sub-process and watching the meter as each is running. The meter can also indicate conflicting demands on an instrument by running the same task twice at two different times. If the speed of the sub-process running the same task the second time is different from the first time, it may imply that there have been conflicting demands on the instrument during one of the two times.

The second type of meter 230 on the visual indication depicts the amount of data used at any given time by a sub-process as the sub-process is running. As the amount of data used by the sub-process changes, the sub-process transmits a signal to the server process. The server then interprets and transmits to the monitor to indicate the amount of data used. If the sub-process requires a significant amount of data, as depicted by the meter, the sub-process may need to be rewritten to reduce the amount of data required.

Finally, the visual indication 208 also includes pictures, 202 and 204, of operators using the system 100. The picture of every operator planning to access one of the sub-processes has previously been digitized and stored in the system. During log on, the system is notified who the user is and a picture of the user will be included on the visual display.

In another preferred embodiment, the present invention is implemented to monitor a rule-based programming environment. Again from FIG. 1, an operator, during the start up phase of the system, first selects a database 108; then selects a rule-base 106; and finally, the operator may select an editor 102 and a browser 104; all of these are sub-processes or software processes. The editor 102 provides a text interface for working on the task, while the browser 104 provides a graphical interface for the task. The rule-base 106 has a plurality of rules and facts.

The sub-processes can be in different instruments. In the embodiment illustrated, the database 180 resides in an instrument different from those instruments having the editor 102, the browser 104, and the rule-base 106; one example is to have the editor 102, the browser 104, the rule-base 106 in a first instrument 14, and the database 108 in a second instrument 50. Another operator can access the database 108 and can have another rule-base 116 running in the first instrument 14. If a sub-process is selected, it is programmed to request connection to a server process.

The server process 10, after receiving the requests, connects with the selected processes, in this case the editor 102, the browser 104, the rule-base 106 and the database 108. The sub-processes asynchronously transmit signals about their states to the server process 10 when their states change. The server process 10 is responsible for receiving and translating the signals from the four sub-processes to a standardized language which is interpreted by a screen manipulation program, the X Window System. Then the server process transmits the interpreted signals to a monitor 200.

Figure 3:
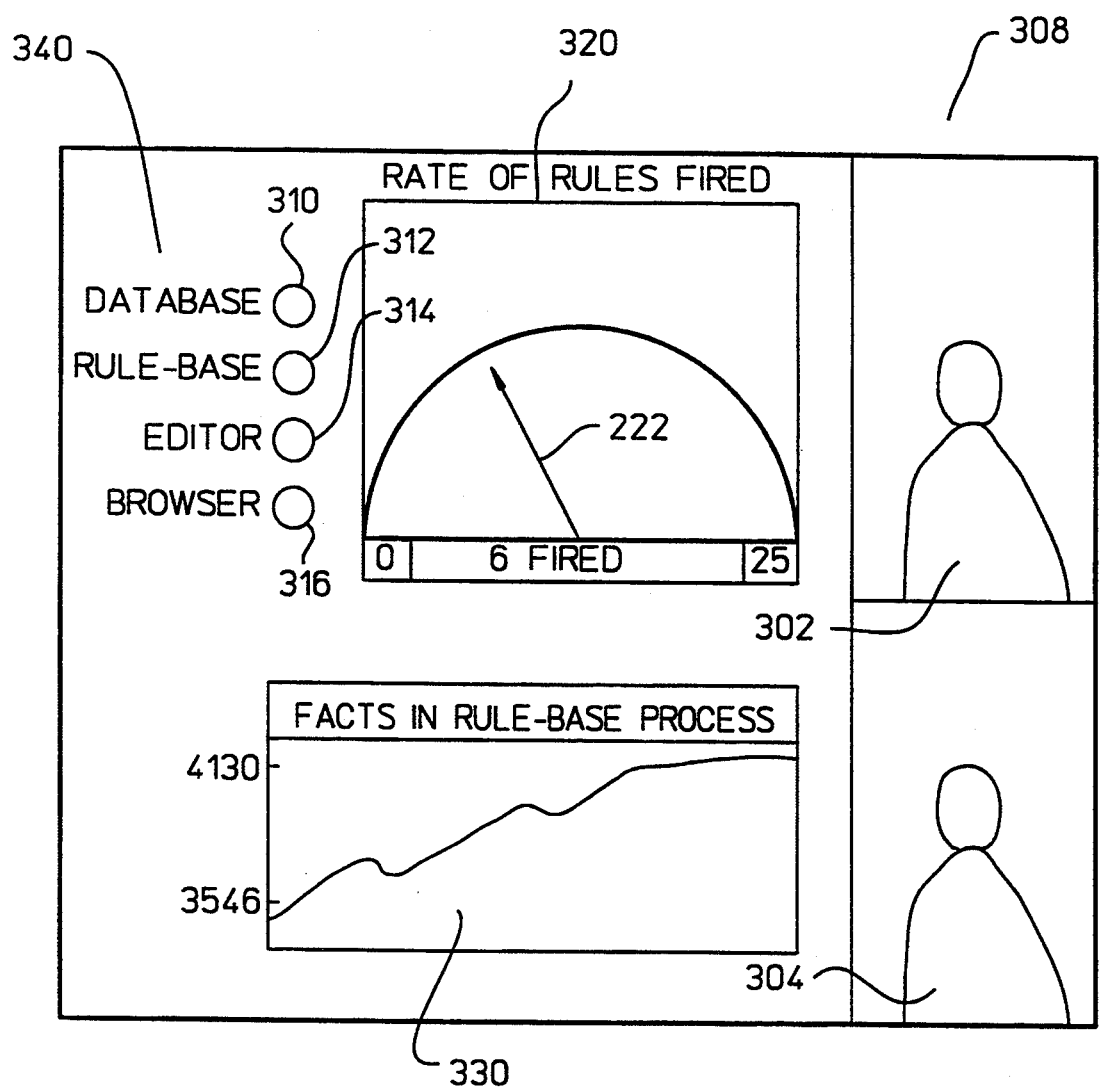
FIG. 3 illustrates another preferred embodiment of the visual indication shown on a monitor.
Figure 4:
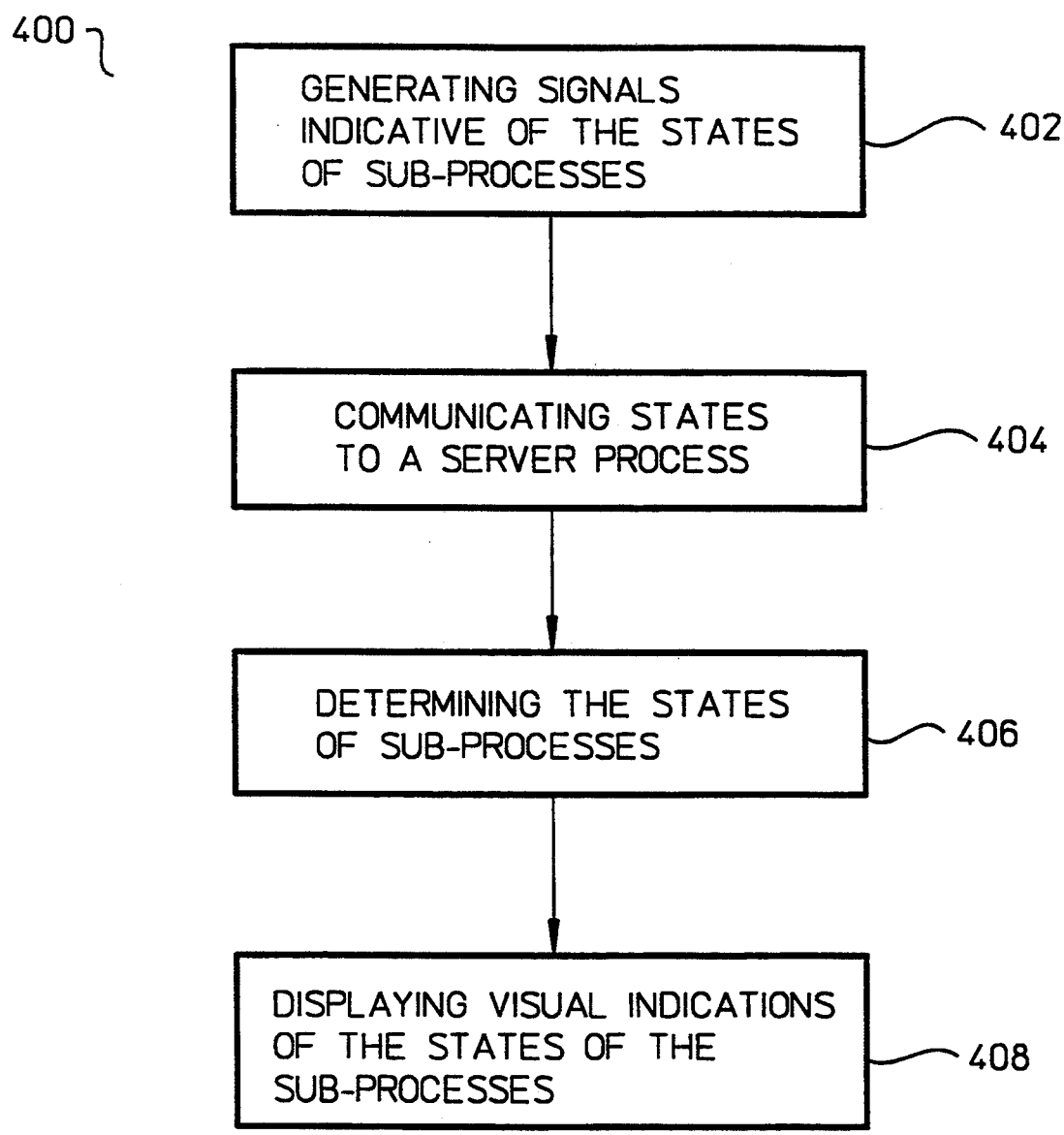
FIG. 4 shows a flowchart of a preferred embodiment of the methods of the present invention.
Figure 5:
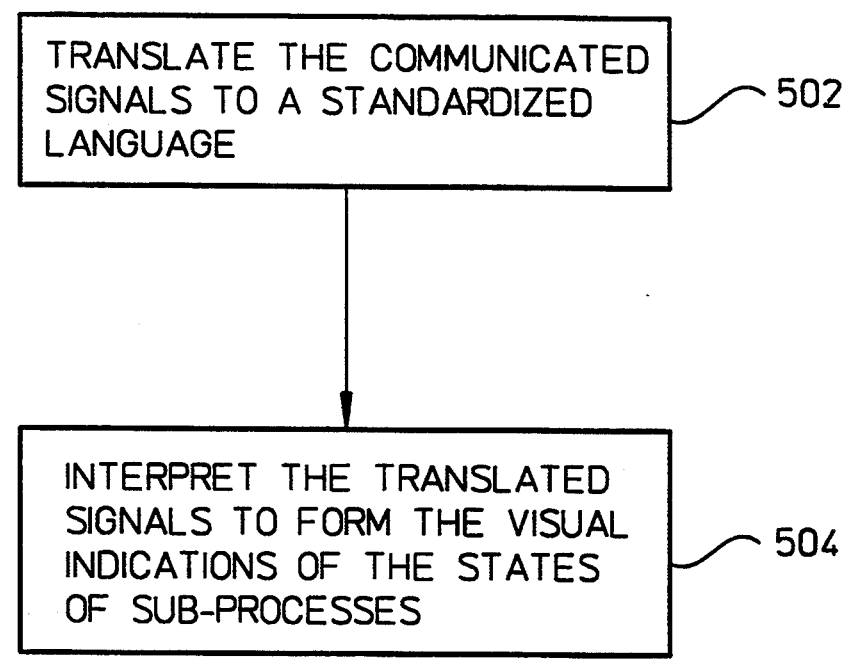
FIG. 5 shows a flowchart of a preferred embodiment to determine the states of the sub-processes by the server process in the present invention.

FIG. 3 illustrates the visual indication 308, which includes four indicator lights 310, 312, 314, and 316, one light representing the state of each sub-process; for example, the first indicator light 310 represents the status of the database 108. Next to each indicator light is an identifier which identifies the sub-process represented by the light; for example, next to the first indicator light 310 is the identifier 340 which states "database."

The visual indication 308 further includes two types of meters. One type of meter 320 indicates the rate at which the rules are fired or ran in the rule-base 106; a slow rule-base 106 might indicate that the rules being executed are complicated, or there are conflicting demands on the first instrument 14, or the first instrument 14 is just slow. If the speed of the rule-base 106 changes one time from the next when the rule-base 106 is working on the same task, it may imply that there were conflicting demands on the first instruments 14 during one of the two prior runs.

The second type of meter 330 portrays the number of facts being used by the rule-base while the rule-base is running. If the rule-base requires a significant number of facts, it may be desirable to improve the rule-base to reduce the number of facts.

Finally, the visual indication 308 also includes pictures, 302 and 304, of each user using the system 100.

From the foregoing, it will be appreciated that an operator using the invention gets direct and immediate visual feedback on the states of a plurality of sub-processes working on a task. The operator does not have to log onto every instrument having each of the sub-processes to find out the states of the sub-processes.

With the invention, the states of the sub-processes are simultaneously displayed on a monitor. This helps the operator to use the sub-processes more efficiently and to identify quickly any bottleneck in the task.

Although a specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. In a distributed computer system comprising a plurality of instruments, at least one monitor, and executing a server process, a method of indicating the states of a plurality of software sub-processes that are working together on a task selected by an operator, the sub-processes being coupled to said server process, each sub-process performing at least a part of the task, each sub-process having been programmed to generate signals indicating its state, the states of a sub-process comprising executing, ready, waiting, and stopped, and each sub-process residing in one of said plurality of instruments in said distributed computer system before the operator starts the method, the method comprising the steps of:

generating by each sub-process a signal indicative of the state of that sub-process, said signal being generated in response to a change in state of said sub-process, said signal being unsolicited by the server process, said signal being expressed in a language convenient for said sub-process, said language not required to be the same language for each sub-process;

communicating by each sub-process the generated signals from the sub-processes to the server process;

determining by the server process the states of the sub-process, said determining comprising interpreting the signals received from the sub-processes;

displaying by the server process, via a screen manipulation program, a visual indication of the states of the sub-processes on a monitor; and repeating from the step of generating until the method is stopped;

such that the operator is provided with a visual indication of the states of the sub-processes working on the task.

2. A method as in claim 1, wherein the step of determining the states of the sub-processes by the server process comprises:

translating the communicated signals from each of the sub-process to a standardized language; and using a screen manipulation program to interpret each of the translated signals to form the visual indication of the state of each of the sub-processes.

3. A method as in claim 2, wherein displaying the visual indication comprises displaying a plurality of representations of indicator lights, one light associated with, and indicating the state of, each sub-process.

4. A method as in claim 3, wherein displaying the visual indication of an indicator light comprises displaying the light in a first state if the associated sub-process is busy and in a second state if the sub-process is idle.

5. A method as in claim 3, wherein displaying the visual indication further comprises displaying a plurality of identifiers, one identifier is next to each indicator light identifying the sub-process represented by the light.

6. A method as in claim 1, wherein communicating a generated signal from a sub-process to the server process when the state of that sub-process changes such that the server process does not continuously monitor the states of each of the sub-processes.

7. A method as in claim 2, wherein displaying the visual indication comprises displaying the speed of one of the sub-processes as that sub-process is working on the task.

8. A method as in claim 2, wherein displaying the visual indication comprises displaying the amount of data used at any given time by one of the sub-processes as that sub-process is working on the task.

9. A method as in claim 2, wherein displaying the visual indication comprises displaying a picture of each operator using the distributed system.

* * * * *